(No Model.)

G. WOSTENHOLM.
WASHING MACHINE.

No. 330,360. Patented Nov. 10, 1885.

Witnesses
J. W. Hoke.
Edward L. Furrell.

Inventor:
George Wostenholm
by C. D. Moody
atty.

UNITED STATES PATENT OFFICE.

GEORGE WOSTENHOLM, OF JEFFERSONVILLE, ILLINOIS, ASSIGNOR OF ONE-HALF TO JOHN J. FISCHER, OF ST. LOUIS, MISSOURI.

WASHING-MACHINE.

SPECIFICATION forming part of Letters Patent No. 330,360, dated November 10, 1885.

Application filed August 15, 1885. Serial No. 174,511. (No model.)

*To all whom it may concern:*

Be it known that I, GEORGE WOSTENHOLM, a citizen of the United States, residing at Jeffersonville, Wayne county, State of Illinois, have invented a new and useful Improvement in Washing-Machines, of which the following is a specification.

My invention relates to an improvement in that class of washing-machines in which a water-circulation is maintained through the chamber containing the clothes by causing the water to flow from the chamber downward past a valvular opening into a space beneath the chamber, and thence upward through a passage or passages, so as to re-enter the chamber at its upper end.

The object of my improvement is to insure a uniform circulation and distribution of water through the clothes-chamber, and to enable every part of the machine to be detached with the greatest facility.

Figure 1:
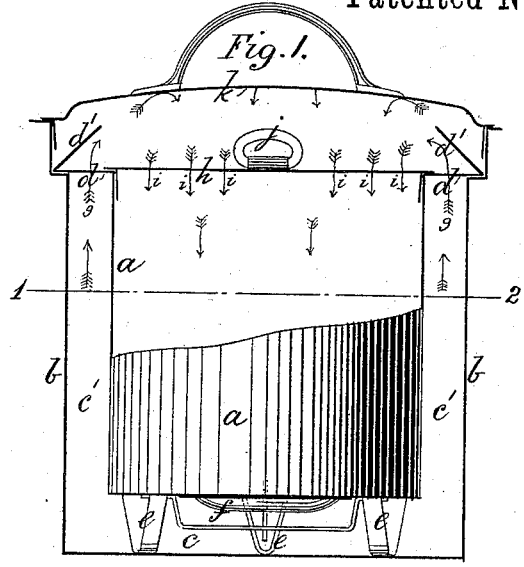
Figure 2:
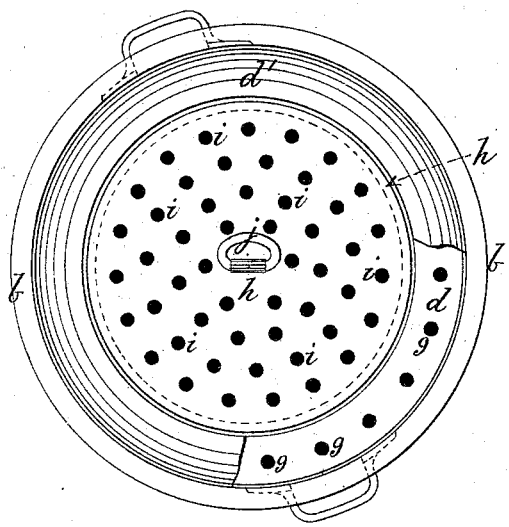
Figure 3:
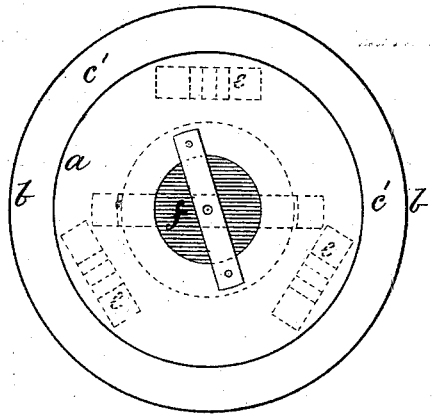

My invention is illustrated by the accompanying drawings, in which Figure 1 is a vertical sectional elevation of my improved washing-machine; Fig. 2, a plan thereof (partly broken away,) with top cover removed; and Fig. 3, a section on line 1 2 in Fig. 1, like letters of reference indicating like parts in all the figures.

The clothes-chamber $a$ may be of a cylindrical, elliptical, or any other suitable shape, and is placed within a similarly-shaped outer chamber or vessel, $b$, a suitable space, $c\ c'$, being left all round between the bottoms and circumferences, respectively, of the chambers $a$ and $b$. The clothes-chamber $a$ is supported loosely in the outer chamber or vessel, $b$, by a flange, $d$, formed round the upper edge or mouth of the clothes-chamber $a$, and resting on a flanged enlargement at the top of the outer chamber or vessel, $b$, and by legs or feet $e$, attached to the bottom of the clothes-chamber $a$, and resting on the bottom of the outer chamber or vessel, $b$. The clothes-chamber $a$ communicates with the outer chamber or vessel, $b$, by the bottom outlet-valve, $f$. Through the bearing-flange $d$ are holes $g$, Fig. 2, communicating with the outer chamber or vessel, $b$. $h$ is a plate or cover perforated with holes $i$, Fig. 2, and placed over the mouth of the clothes-chamber $a$, whence it may be removed at pleasure by the handle $j$. $k$ is a close cover to the upper end or mouth of the outer chamber or vessel, $b$.

By the above arrangement the chambers $a$ and $b$ being partially filled with water and the clothes placed in the chamber $a$, on the application of heat to the outer chamber or vessel, $b$, the steam generated from the water therein, together with the water carried off by ebullition, will rise through the holes $g$, as indicated by arrows in Fig. 1, in the bearing-flange $d$, and being deflected by the outer beveled flange, $d'$, and by the under side of the overhead cover $k$ will enter the clothes-chamber $a$ through the holes $i$ of cover $h$, and mingle with the water contained in the clothes-chamber $a$ until the increasing volume of water in the latter will open the valve $f$ and pass through into the outer chamber, $b$, whereby a continued circulation of water is set up between the chambers $a$ and $b$, this circulation being rendered uniform and perfect in consequence of its taking place through a continuous annular space between the chambers $a$ and $b$, combined with the distributing action of the holes $i$, in lieu of through pipes or passages connecting the two vessels, as heretofore.

The various parts of the improved machine, being loosely placed together, and not bolted or connected together in any way, may be easily taken apart and replaced.

A most important advantage of the arrangement is that the annular space $c'$ being comparatively narrow, the circulating water rises all round the outside of the clothes-chamber $a$, and on entering the latter is diffused uniformly over the interior instead of entering at one or two parts only, as at present, whereby the clothes are more quickly and evenly cleansed. This effect is still further increased by the use of the perforated plate $h$.

I claim as my invention—

1. The combination of the clothes-chamber $a$, having a bottom outlet-valve, $f$, with outer vessel, $b$, between which and the clothes-chamber $a$ is a bottom space, $c$, communicating with a narrow annular space, $c'$, extending all round the clothes-chamber $a$, and with cover $k$, and deflecting-flange $d'$, substantially as shown, and for the purpose described.

2. The combination of the clothes-chamber $a$, having a bottom outlet-valve, $f$, with outer vessel, $b$, between which and the clothes-chamber $a$ is a bottom space, $c$, communicating with a narrow annular space, $c'$, extending all round the clothes-chamber $a$, and with cover $k$, deflecting-flange $d'$, and perforated plate or cover $h$, substantially as shown, and for the purpose specified.

3. The combination of the clothes-chamber $a$, having outlet-valve $f$, with outer chamber or vessel, $b$, between which and the clothes-chamber $a$ is a bottom space, $c$, communicating with a narrow annular space, $c'$, extending all round the clothes-chamber $a$, and with cover $k$, and perforated plate or cover $h$, substantially as shown, and for the purpose specified.

Witness my hand.

GEORGE WOSTENHOLM.

Witnesses:
C. D. MOODY,
J. W. HOKE.